United States Patent [19]

Spoerl

[11] 3,755,956
[45] Sept. 4, 1973

[54] LIVE BAIT DISPENSER
[75] Inventor: Hans Spoerl, Great Falls, Mont.
[73] Assignee: The Raymond Lee Organization, Inc., New York, N.Y.; a part interest
[22] Filed: Nov. 22, 1971
[21] Appl. No.: 200,987

[52] U.S. Cl. .................................................. 43/55
[51] Int. Cl. ............................................. A01k 97/04
[58] Field of Search ................ 43/55, 54.5 R, 54.5 A

[56] References Cited
UNITED STATES PATENTS

| | | | |
|---|---|---|---|
| 2,579,549 | 12/1951 | Cave | 43/55 |
| 2,948,986 | 8/1960 | Williamson | 43/55 |
| 2,503,276 | 4/1950 | Kranitz | 43/55 |
| 3,308,570 | 3/1967 | Horton | 43/55 |
| 956,801 | 5/1910 | Eaton | 43/54.5 R |
| 3,245,172 | 4/1966 | Hawks | 43/55 |

Primary Examiner—Louis C. Mancene
Assistant Examiner—James H. Czerwonky
Attorney—Howard I. Podell

[57] ABSTRACT

Apparatus for the holding and dispensing of live insect bait used by fishermen, and particularly for the holding and dispensing of grasshoppers. The device is in the form of a curved box adaptable to being worn on the belt of a fisherman, and contains a ventilated storage area for holding a quantity of grasshoppers, with one or more tubular traps projecting through the top of said box. Such traps are sized to contain only one grasshopper and are fitted with resilient prongs to hold a grasshopper that is attracted to the trap from the container by the light of the transparent trap cover. Plunger means are mounted on the prongs to bend the prongs towards each other so as to entrap a grasshopper therebetween. Removal of the trap cover permits the removal of the insect, without permitting additional insects in the bait box to escape.

1 Claim, 5 Drawing Figures

PATENTED SEP 4 1973　　　　　　　　　　　　　　　3,755,956

LIVE BAIT DISPENSER

SUMMARY OF THE INVENTION

This invention relates to a means for fishermen to hold live insect bait, and particularly grasshoopers, with means to dispense one insect at a time from the container.

The device consists of a curved box, designed to be worn on the belt of a fish erman, the box having a hinged flap for the inserting of insects, sufficient perforations to insure adequate ventilation in the box, and one or more dispensing traps which are sized to accommodate only one grasshopper at a time. The dispensing traps are removable from the container, and may be tubular in form with a removable transparent cover. The transparent cover serves to attract the insect into the trap, in which it is held by resilient prongs until removed. The entire trap with the detained insect may be removed as desired.

BRIEF DESCRIPTION OF THE INVENTION:

The objects and features of the invention may be understood with reference to the following detailed description of an illustrative embodiment of the invention taken together with the accompanying drawing in which.

Figure 1:
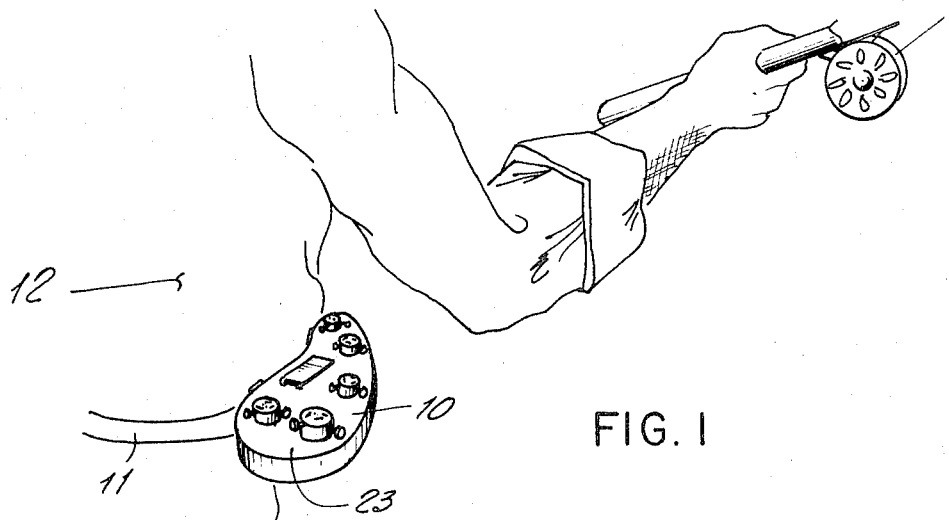
FIG. 1 is a perspective view of the device beign worn about the belt of a fisherman.
Figure 2:
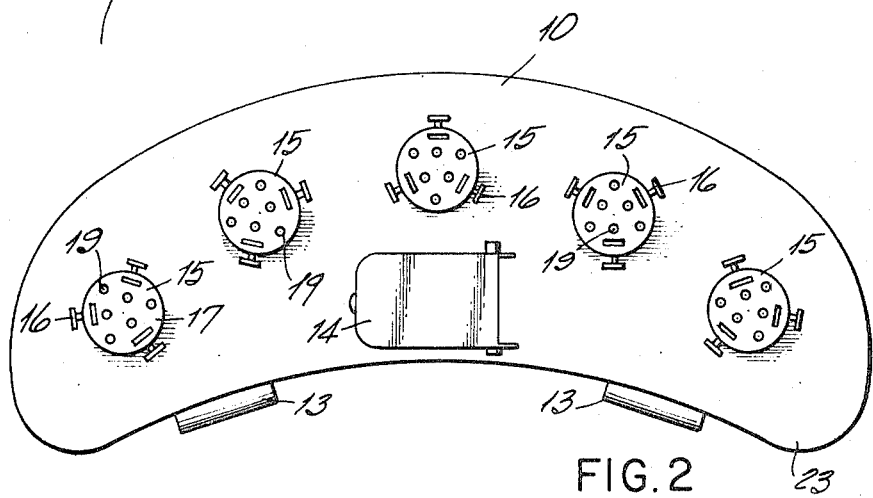
FIG. 2 is a plan view of the device.
Figure 3:
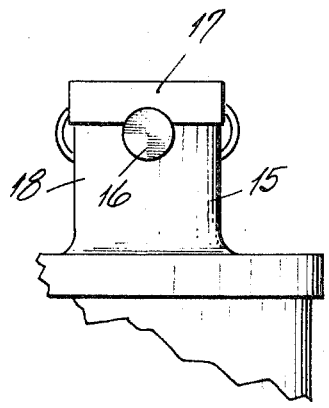
FIG. 3 is a side view of one trap.
Figure 4:
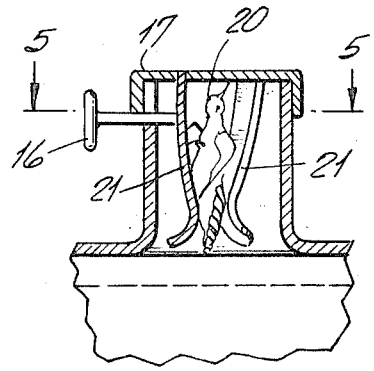
FIG. 4 is a cross-section taken from the same position of FIG. 3.
Figure 5:
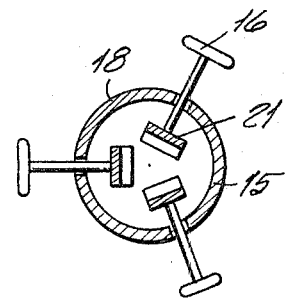
FIG. 5 is a cross-section taken from line 5—5 of FIG. 4.

DESCRIPTION OF THE PREFERRED EMBODIMENT:

Turning now descriptively to the drawing in which similar reference characters denote similar elements troughout the several views, FIG. 1 illustrates the insect bait box 10 worn about belt 11 of fisherman 12.

As shown in FIGS. 2-5, the bait box 10 is curved to fit about the fisherman's waist, with buckles 13 adaptable to fastening to a belt 11. A hinged flap 14 in the top of the bait box 10, permits the adding of live grasshoppers 20 into the bait box, which is fabricated of opaque plastic or metal material except for the transparent plastic covers 17 of the dispenser traps 15 which may protrude above the top 23 of bait box 10.

Dispenser traps 15 may be of a cylindrical shape with a removable transparent cover 17 containing ventilation holes 19 and several externally mounted push-buttons 16 protruding from the side 18 of the trap 15. The push-buttons 16 connect internally with flat springs 21 for gripping a grasshopper 20 that is attracted to the light from the transparent cover 17.

The grasshopper 20 may be held by a slight pressure on buttons 16 so that cover 17 may be removed and the grasshopper taken out of the trap, without permitting additional grasshoppers to escape.

Since obvious changes may be made in the specific embodiment of the invention described herein without departing from the scope thereof, it is indicated that all matter contained herein is intended to be interpreted in an illustrative sense and not in a limiting sense.

Having thus described my invention, what I claim as new, and desire to secure by Letters Patent of the United States is:

1. A bait box for fishermen adaptable for containing a number of grasshoppers in the live condition, said box being of opaque construction except for a removable transparent cover mounted over a cylindrical neck section of the box and wich protrudes above the top wall of the container, with light passing terough said transparent cover serving as a means of attracting a loose grasshopper in the container into said neck section, together with three resilient prongs which are fitted to the inner side of said cover so as to each project away from the cover and to enclose a space of a volume and size sufficient to contain a grasshopper which has been attracted by the light into the neck section below the cover, together with plunger means mounted on said prongs and passing through said neck section, said plunger means serving to bend the flexible prongs towards each other when the plunger means are manually compressed by the user, so as to entrap a grassopper in the neck section permitting the user to withdraw the cover and the entrapped grasshopper from the bait box.

* * * * *